(12) United States Patent
Wernick

(10) Patent No.: US 6,199,611 B1
(45) Date of Patent: Mar. 13, 2001

(54) WHEEL CARRIER FOR MOTOR VEHICLE WITH A TIRE-INFLATING SYSTEM

(75) Inventor: Gerhard Wernick, Neuzeug (AT)

(73) Assignee: Steyr-Daimler-Puch Aktiengesellschaft, Vienna (AT)

( * ) Notice: Subject to any disclaimer, the term of this patent is extended or adjusted under 35 U.S.C. 154(b) by 0 days.

(21) Appl. No.: 09/145,997

(22) Filed: Sep. 2, 1998

(30) Foreign Application Priority Data

Sep. 9, 1997 (AT) .............................................. GM 556/97

(51) Int. Cl.[7] .................................................... B60C 23/00
(52) U.S. Cl. ............................................................ 152/417
(58) Field of Search .................................... 152/415, 417, 152/416, 418; 301/105.1; 180/258, 259

(56) References Cited

U.S. PATENT DOCUMENTS

| | | | |
|---|---|---|---|
| 2,341,755 | * 2/1944 | Ash | 180/259 X |
| 2,349,388 | * 5/1944 | Sturges | 180/259 X |
| 2,685,184 | * 8/1954 | Nadoz et al. | 180/259 X |
| 3,705,614 | * 12/1972 | Juttner et al. | 152/417 |
| 4,119,167 | * 10/1978 | Yamada et al. | 180/259 |
| 4,431,043 | * 2/1984 | Goodell et al. | 152/417 |
| 4,492,019 | * 1/1985 | Wells et al. | 152/417 X |
| 4,696,334 | * 9/1987 | Le Chatelier et al. | 152/417 |
| 4,804,027 | 2/1989 | Runels . | |

* cited by examiner

Primary Examiner—Russell D. Stormer
(74) Attorney, Agent, or Firm—Bachman & LaPointe, P.C.

(57) ABSTRACT

A wheel carrier for the steered wheel of a motor vehicle with a tire-inflating system, the wheel carrier comprising a shield with an eye at the top and bottom for receiving a kingpin, an axle tube which supports wheel bearings, a wheel hub supported on the wheel bearings, a steering arm, an air duct leading through the wheel carrier into a chamber formed between the axle tube and wheel hub, the chamber being sealed off on both sides, wherein the steering arm is flanged to a sprue with a fitting surface, wherein an air chamber is formed in the fitting surface, and is connected to the chamber by an air duct and is further connected to a tube communicating to the outside of the sprue.

3 Claims, 3 Drawing Sheets

WHEEL CARRIER FOR MOTOR VEHICLE WITH A TIRE-INFLATING SYSTEM

BACKGROUND OF THE INVENTION

The present invention relates to a wheel carrier for the steered wheel of a motor vehicle having a tire-inflating system, the wheel carrier comprising a shield with an eye at the top and bottom for receiving a kingpin, an axle tube which bears wheel bearings, and a steering arm, an air duct leading through the shield and the axle tube into a chamber which is formed between the wheel bearing and is sealed off on both sides.

U.S. Pat. No. 4,804,027 discloses a wheel carrier in which a separate air-supplying ring is provided on the wheel carrier. The air-supplying ring causes the air to be directly connected to the rotating wheel hub and, as a result, the seals which are required for initiating the rotation are of a large diameter and lie well to the outside, with the result that they are exposed without protection to environmental effects (for example, when driving in muddy water). It would be better if the ducting were in the axle tube but this is difficult to accomplish because of the cross sections which are necessary for sufficient air throughput.

In addition, it is difficult for an air-supplying ring to be accommodated if there is a steering axle on the wheel carrier, which in that case also has a steering arm; it is particularly difficult if the wheel carrier furthermore has to carry the brake calliper of a disk brake. Overall, there is a space problem which is made even more difficult by the exterior supply of the air to the wheel carrier not being able to take place on the lower side thereof, for safety reasons.

It is, therefore, a principle object of the invention to solve the above-mentioned space problems in such a manner that the air is guided in the wheel carrier with a minimal outlay on construction and manufacture.

SUMMARY OF THE INVENTION

The foregoing object is achieved by the present invention wherein the steering arm is flanged to a sprue with a fitting surface, an air chamber is formed starting from the fitting surface of the sprue, into which air chamber the air duct opens, and the air chamber is connected to a tube connection on the outside of the sprue via a branch duct which leads upward.

Owing to the steering arm being flange-mounted, space is provided for the supply of air from the outside at a suitable point on the wheel carrier. Furthermore, the air ducts can thereby be simply bored in the wheel carrier and a separate air-supplying ring rendered unnecessary. The air chamber which starts from the fitting surface can easily be molded in (it is already closed on one side by the screwed-on steering arm) and has the further advantage of avoiding an accumulation of material in the casting due to the sprue, thereby achieving a better quality of casting.

In a particular feature of the invention, the air duct comprises an essentially radial hole in the shield and two essentially axial, parallel holes in the axle tube, which parallel holes both form an intersection with the radial hole. It is thus possible for a cross section which is sufficient for the supply of air to be accommodated in the axle tube without weakening the latter. In the case of a driven axle, the wall thickness of the axle tube is limited structurally.

In a preferred embodiment of the invention, a further air chamber can be formed in the sprue, which air chamber is connected to the interior of the axle tube via an essentially radial, further hole and is connected to the ambient air via a further branch duct. A further hole of this type is required to ventilate the interior, in particular if there is a drive axle with exterior wheel transmission by means of a planetary gear mechanism.

For reasons of space economy and traffic safety it is advantageous to form the sprue on the side of the shield which is at the rear in the direction of travel and to mount a disk brake on the front side of the sprue.

Finally, it is furthermore advantageous to arrange the chamber, which is sealed off on both sides, between the wheel bearings. As a result, the sensitive seals, which are subjected to severe stress, are only exposed to minimal eccentricities and lateral displacements due to thermal expansion, which increases their durability.

Other advantages, features and details of the invention will be made clear from the following detailed description.

BRIEF DESCRIPTION OF THE DRAWINGS

The invention is described with reference to figures of an exemplary embodiment. The drawings show the following.

DETAILED DESCRIPTION

Figure 1:
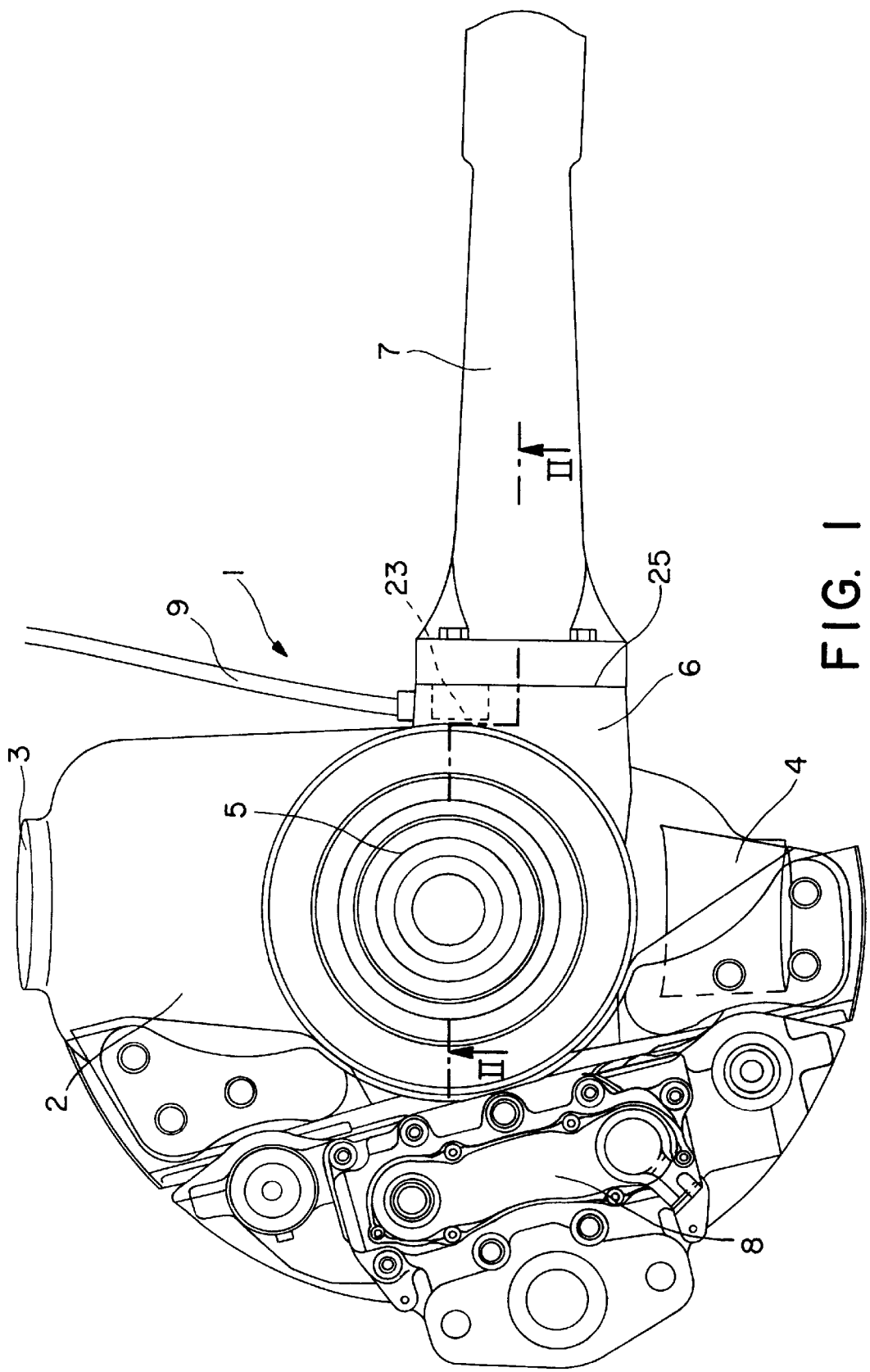
FIG. 1: A view of the wheel carrier from the outside of the vehicle.

In FIG. 1 the wheel carrier is denoted by 1. It comprises an essentially vertical, curved shield 2 with an upper eye 3 and a lower eye 4 for the mounting of a kingpin (not shown), and furthermore comprises an axle tube 5 which is of integral design with the shield 2. The wheel carrier furthermore has a sprue 6 which is on the rear side, as seen in the direction of travel of the vehicle, into which a steering arm 7 is screwed. On the upper side of the sprue 6 a connection is provided for an air supply line 9 through which the air required for the tire-inflating system is supplied, from a central air-supply and control system (not shown), and exhausted. Reference numeral 8 denotes a disk brake calliper. It can be seen that the space conditions in and around the wheel carrier are very tight, not least due to the disk brake.

Figure 2:
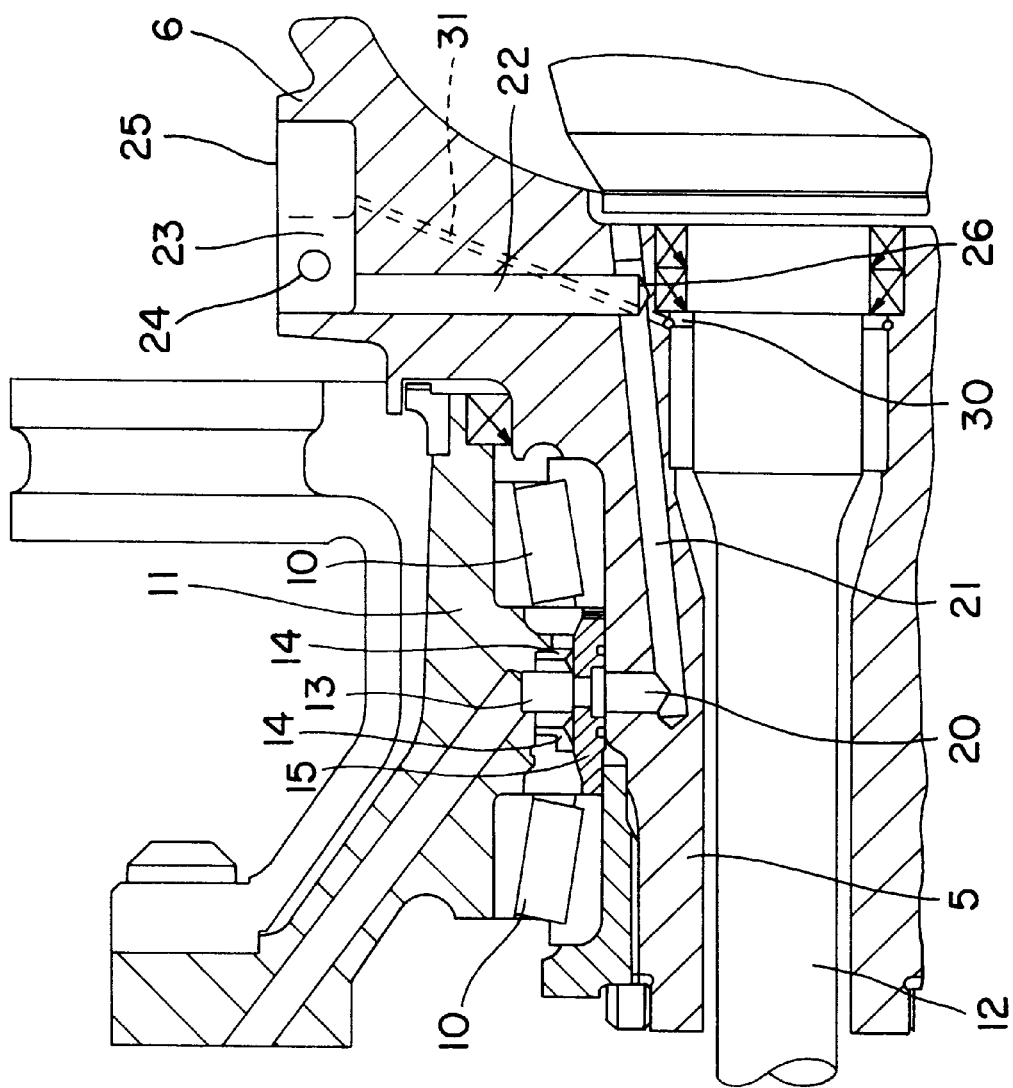
FIG. 2: A horizontal section according to II—II in FIG. 1.
Figure 3:
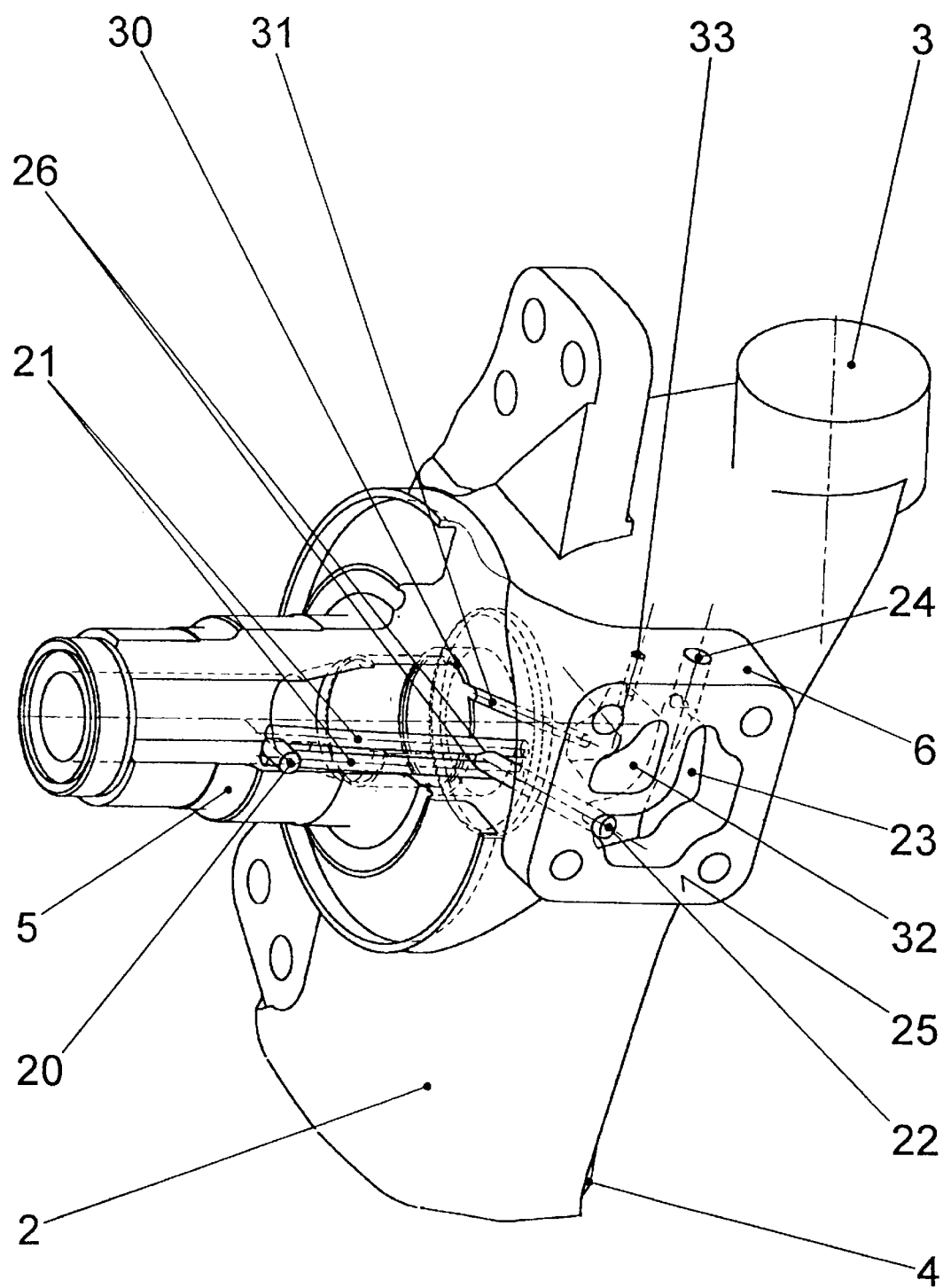
FIG. 3: An axonometric view, with the steering arm removed.

The air guide can be seen in FIGS. 2 and 3, Two wheel bearings 10 are seated on the axle tube 5, which wheel bearings 10 are used for the rotatable mounting of a wheel hub 11. The wheel hub is driven by a drive shaft 12, it being possible for the connection between the latter and the wheel hub 11 to be produced in any known manner, if appropriate via a step-down planetary gear mechanism. A chamber 13 is formed between the axle tube 5 and hub 11 and between the wheel bearings 10, via which chamber the air from the stationary axle tube 5 is admitted into the rotating wheel hub 11. The chamber is delimited on both sides by seals 14 which slide on a non-rotating slip ring 15.

An air duct leads from the chamber 13 or slip ring 15 through the wheel carrier. The air duct comprises a radial, first conduit 20, at least one essentially axial, second conduit 21 and an essentially radial, third conduit 22 which opens into an air chamber 23. A branch duct 24 leads from the latter outward to the connection of the air line 9. The essentially axial, second conduit 21 is doubled, as can be seen in FIG. 3, in order to accommodate a sufficient line cross section in the wall thickness of the axle tube. The two second conduit 21 form an intersection 26 with the radial conduit 22 and also with the first conduit 20. The air chamber 23 is produced in the sprue 6 during the casting process. The sprue 6 has a fitting surface 25 onto which the steering arm 7 is screwed and in this manner closes off the air chamber 23.

Between the axle tube and the drive shaft 12 is an interior space 30 which is connected to a further air chamber 32 via a further hole 31 (see FIG. 3) and from which again a further branch duct 33 leads to the outside. This ensures that the axle interior is ventilated.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A wheel carrier for the steered wheel of a motor vehicle with a tire-inflating system, the wheel carrier comprising a shield with an eye at the top and bottom for receiving a kingpin, a sprue having a fitting surface, an axle tube which supports wheel bearings, a wheel hub supported on the wheel bearings, a steering arm, an air duct leading through the wheel carrier into a chamber formed between the axle tube and wheel hub, the chamber having opposed side and is sealed off on the opposed sides, wherein the steering arm is connected to the sprue with the fitting surface, wherein an air chamber is formed in the fitting surface, and is connected to a branch duct in the sprue communicating the air chamber to an exterior air line mounted on the sprue.

2. The wheel carrier as claimed in claim 1, wherein the air duct comprises a substantially radial conduit in the shield and two substantially axial, parallel conduits in the axle tube, the parallel conduits both intersect with the radial conduit.

3. The wheel carrier as claimed in claim 1, wherein a second air chamber is formed in the sprue, which is connected to the interior of the axle tube by a substantially radial conduit and is further connected to the ambient air by a further branch duct.

* * * * *